(12) United States Patent
Li

(10) Patent No.: US 10,991,151 B2
(45) Date of Patent: Apr. 27, 2021

(54) GAME RENDERING METHOD, TERMINAL, AND NON-TRANSITORY COMPUTER-READABLE STORAGE MEDIUM

(71) Applicant: Guangdong Oppo Mobile Telecommunications Corp., Ltd., Guangdong (CN)

(72) Inventor: Senlin Li, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/567,793

(22) Filed: Sep. 11, 2019

(65) Prior Publication Data
US 2020/0082608 A1    Mar. 12, 2020

(30) Foreign Application Priority Data
Sep. 12, 2018   (CN) .......................... 201811063404.X

(51) Int. Cl.
*G06F 9/54* (2006.01)
*G06T 11/00* (2006.01)
(Continued)

(52) U.S. Cl.
CPC ............ *G06T 15/506* (2013.01); *G06F 9/545* (2013.01); *G06T 11/001* (2013.01); *G06T 15/005* (2013.01)

(58) Field of Classification Search
CPC ....... G06F 9/545; G06F 9/451; G06T 15/005; A63F 13/52
See application file for complete search history.

(56) References Cited

U.S. PATENT DOCUMENTS

2005/0041031 A1*  2/2005  Diard .................... G09G 5/393
                                                                                345/505
2012/0117145 A1   5/2012  Clift et al.
(Continued)

FOREIGN PATENT DOCUMENTS

CN     101606181 A    12/2009
CN     102438180 A    5/2012
(Continued)

OTHER PUBLICATIONS

Extended European search report issued in corresponding European application No. 19195158.1 dated Feb. 20, 2020.
(Continued)

*Primary Examiner* — Grace Q Li

(57) ABSTRACT

A game rendering method and a terminal are provided. The method includes the following. A rendering instruction is stored when a JS engine of the terminal receives the rendering instruction, where the rendering instruction carries a plurality of data identifiers of to-be-rendered data, a plurality of time interval identifiers corresponding to the data identifiers, and a plurality of rendering parameter identifiers corresponding to the time interval identifiers. The rendering instruction is sent to a target rendering system. A target time interval identifier corresponding to current time is determined, and a target data identifier and a target rendering parameter identifier corresponding to the target time interval identifier are determined. To-be-rendered data corresponding to the target data identifier and target rendering parameter corresponding to the target rendering parameter identifier, are determined. Then the target rendering system performs a rendering operation on the to-be-rendered data according to the target rendering parameter.

18 Claims, 7 Drawing Sheets

(51) Int. Cl.
*G06T 15/00* (2011.01)
*G06T 15/50* (2011.01)

(56) References Cited

U.S. PATENT DOCUMENTS

| | | | | |
|---|---|---|---|---|
| 2014/0176604 | A1* | 6/2014 | Venkitaraman | G06F 16/444 345/633 |
| 2017/0132768 | A1* | 5/2017 | Bedi | H04L 67/36 |
| 2018/0011822 | A1* | 1/2018 | Kwak | G06F 40/14 |
| 2019/0007754 | A1* | 1/2019 | Master | H04N 21/8547 |

FOREIGN PATENT DOCUMENTS

| | | |
|---|---|---|
| CN | 103713891 A | 4/2014 |
| CN | 103999046 A | 8/2014 |
| CN | 105701854 A | 6/2016 |
| CN | 106296788 A | 1/2017 |
| CN | 106407014 A | 2/2017 |
| CN | 106683199 A | 5/2017 |
| CN | 107492139 A | 12/2017 |
| CN | 107832108 A | 3/2018 |
| CN | 107958480 A | 4/2018 |
| CN | 108176048 A | 6/2018 |
| CN | 108434742 A | 8/2018 |
| JP | 2013094609 A | 5/2013 |
| WO | 2004040520 A1 | 5/2004 |
| WO | 2018050003 A1 | 3/2018 |

OTHER PUBLICATIONS

International search report issued in corresponding international application No. PCT/CN2019/103111 dated Nov. 29, 2019.
The First Office Action with English Translation issued in corresponding CN application No. 201811063404.X dated Mar. 3, 2021.
Lu Chen et al, "Research and Implementation of 3D Game Engine Technology-Real-time Graphic Rendering of Large-scale Scene", dated Nov. 15, 2015.

* cited by examiner

GAME RENDERING METHOD, TERMINAL, AND NON-TRANSITORY COMPUTER-READABLE STORAGE MEDIUM

CROSS-REFERENCE TO RELATED APPLICATION(S)

This application claims priority to Chinese Patent Application Serial No. 201811063404.X, filed on Sep. 12, 2018, the entire disclosure of which is hereby incorporated by reference in its entirety.

TECHNICAL FIELD

The present disclosure relates to the field of electronic technologies, and more particularly to a game rendering method, a terminal, and a non-transitory computer-readable storage medium.

BACKGROUND

With popularization and widely use of electronic devices (such as mobile phones, tablets, etc.), more and more applications can be supported by the electronic devices, and functions of the electronic devices are becoming more and more powerful, which causes the electronic devices to develop towards diversification and individualization, and become indispensable electronic produces in users' lives.

In particular, games are widely used in electronic devices. For games, rendering effects directly affect the user's visual experience. Therefore, how to improve rendering performance needs to be solved urgently.

SUMMARY

Implementations of the present disclosure provide a game rendering method, a terminal, and a non-transitory computer-readable storage medium.

According to a first aspect, the implementation of the present disclosure provides a game rendering method, which is applied to a terminal. The method includes the following. A rendering instruction is stored when a JavaScript (JS) engine of the terminal receives the rendering instruction, where the rendering instruction carries a data identifier set of to-be-rendered data, a time interval identifier set, and a rendering parameter identifier set; where the data identifier set includes a plurality of data identifiers, the time interval identifier set includes a plurality of time interval identifiers, and the rendering parameter identifier set includes a plurality of rendering parameter identifiers; where the data identifiers are in one-to-one correspondence with the time interval identifiers, and the rendering parameter identifiers are in one-to-one correspondence with the time interval identifiers. The rendering instruction is sent to a target rendering system. A target time interval identifier corresponding to current time is determined, and then a target data identifier and a target rendering parameter identifier which correspond to the target time interval identifier are determined according to the rendering instruction. To-be-rendered data corresponding to the target data identifier, and target rendering parameter corresponding to the target rendering parameter identifier, are determined. Then a rendering operation is performed on the to-be-rendered data according to the target rendering parameter by the target rendering system.

According to a second aspect, the implementation of the present disclosures provide a terminal, which includes at least one processor and a computer readable storage coupled to the at least one processor. The computer readable storage stores computer programs thereon, which when executed by the processor, cause the processor to: store a rendering instruction when a JS engine of the terminal receives the rendering instruction, where the rendering instruction carries a data identifier set of to-be-rendered data, a time interval identifier set, and a rendering parameter identifier set; where the data identifier set includes a plurality of data identifiers, the time interval identifier set includes a plurality of time interval identifiers, and the rendering parameter identifier set includes a plurality of rendering parameter identifiers; where the data identifiers are in one-to-one correspondence with the time interval identifiers, and the rendering parameter identifiers are in one-to-one correspondence with the time interval identifiers; send the rendering instruction to a target rendering system; determine a target time interval identifier corresponding to current time, and determine, according to the rendering instruction, a target data identifier and a target rendering parameter identifier which correspond to the target time interval identifier; determine to-be-rendered data corresponding to the target data identifier, and determine target rendering parameter corresponding to the target rendering parameter identifier; and perform, through the target rendering system, a rendering operation on the to-be-rendered data according to the target rendering parameter.

According to a third aspect, the implementation of the present disclosure provides a non-transitory computer-readable storage medium. The non-transitory computer-readable storage medium is configured to store computer programs which, when executed by a processor, cause the processor to: store a rendering instruction when a JS engine of the terminal receives the rendering instruction, where the rendering instruction carries a data identifier set of to-be-rendered data, a time interval identifier set, and a rendering parameter identifier set; where the data identifier set includes a plurality of data identifiers, the time interval identifier set includes a plurality of time interval identifiers, and the rendering parameter identifier set includes a plurality of rendering parameter identifiers; where the data identifiers are in one-to-one correspondence with the time interval identifiers, and the rendering parameter identifiers are in one-to-one correspondence with the time interval identifiers; send the rendering instruction to a target rendering system; determine a target time interval identifier corresponding to current time, and determine, according to the rendering instruction, a target data identifier and a target rendering parameter identifier which correspond to the target time interval identifier; determine to-be-rendered data corresponding to the target data identifier, and determine target rendering parameter corresponding to the target rendering parameter identifier; and perform, through the target rendering system, a rendering operation on the to-be-rendered data according to the target rendering parameter.

BRIEF DESCRIPTION OF THE DRAWINGS

To describe technical solutions in the implementations of the present disclosure or of the related art more clearly, the following briefly introduces the accompanying drawings required for describing the implementations of the present disclosure or the related art. Apparently, the accompanying drawings in the following description only illustrate some implementations of the present disclosure. Those of ordinary skill in the art may also obtain other drawings based on these accompanying drawings without creative efforts.

DETAILED DESCRIPTION

Figure 1:
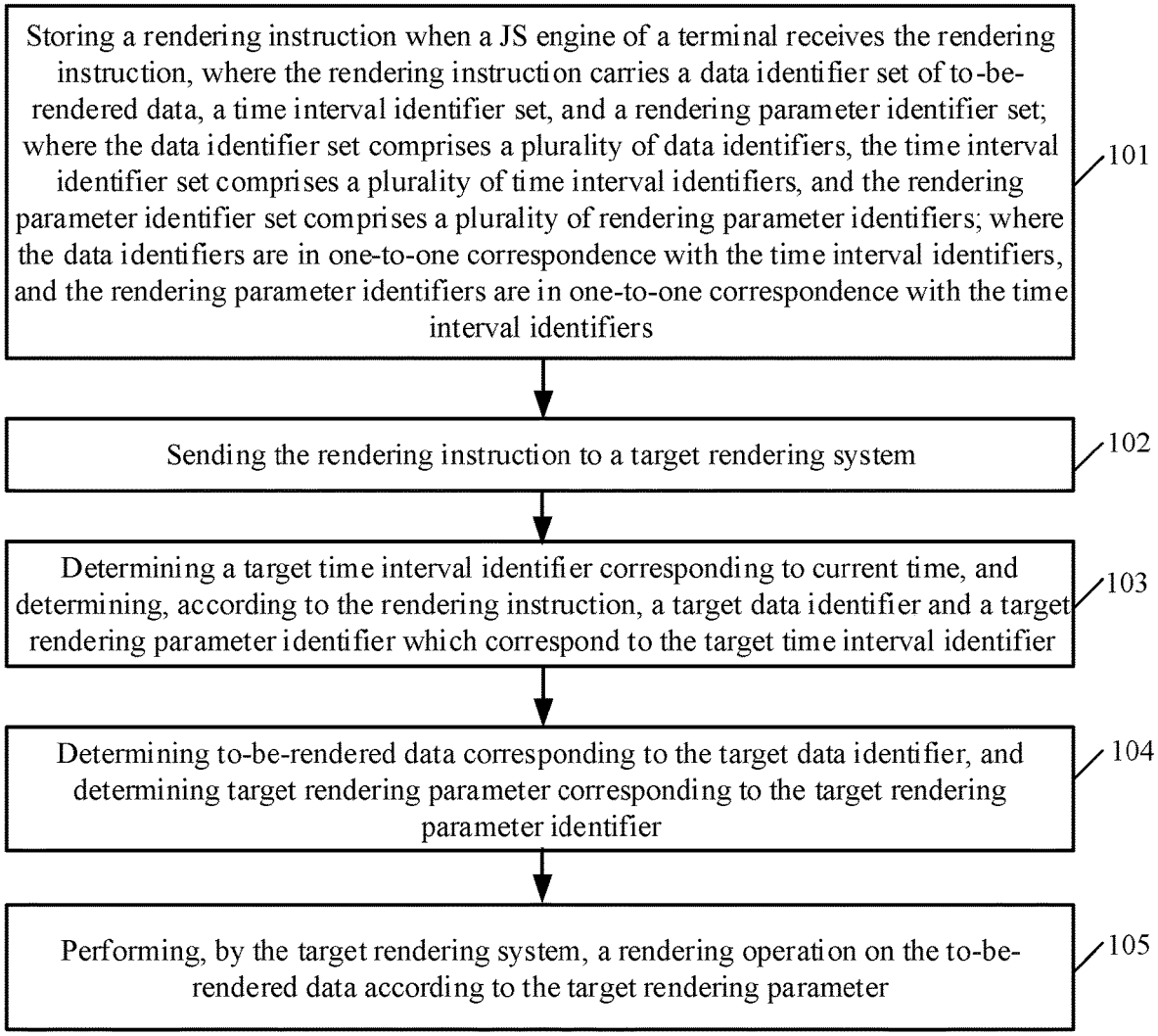
FIG. 1 is a schematic flowchart of a game rendering method according to an implementation of the present disclosure.

In order to enable those skilled in the art to better understand technical solutions of the present disclosure, the technical solutions in implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are used to distinguish different objects, rather than describe a particular order. The terms "include", "comprise", and "have" as well as variations thereof are intended to cover non-exclusive inclusion. For example, a process, a method, a system, a product, or an apparatus including a series of steps or units is not limited to the listed steps or units, on the contrary, it can optionally include other steps or units that are not listed; alternatively, other steps or units inherent to the process, method, product, or device can be included either.

The term "implementation" or "implementation" referred to herein means that a particular feature, structure, or characteristic described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

According to an implementation of the present disclosure, a game rendering method is provided, which is applied to a terminal. The method includes the following. A rendering instruction is stored when a JavaScript (JS) engine of the terminal receives the rendering instruction, where the rendering instruction carries a data identifier set of to-be-rendered data, a time interval identifier set, and a rendering parameter identifier set; where the data identifier set includes a plurality of data identifiers, the time interval identifier set includes a plurality of time interval identifiers, and the rendering parameter identifier set includes a plurality of rendering parameter identifiers; where the data identifiers are in one-to-one correspondence with the time interval identifiers, and the rendering parameter identifiers are in one-to-one correspondence with the time interval identifiers. The rendering instruction is sent to a target rendering system. A target time interval identifier corresponding to current time is determined, and then a target data identifier and a target rendering parameter identifier which correspond to the target time interval identifier are determined according to the rendering instruction. To-be-rendered data corresponding to the target data identifier, and target rendering parameter corresponding to the target rendering parameter identifier, are determined. Then a rendering operation is performed on the to-be-rendered data according to the target rendering parameter by the target rendering system.

According to an implementation of the present disclosure, a game rendering apparatus is provided, which is applied to a terminal. The game rendering apparatus includes a storage unit, a sending unit, a determining unit, and a rendering unit. The storage unit is configured to store a rendering instruction when a JS engine of the terminal receives the rendering instruction, where the rendering instruction carries a data identifier set of to-be-rendered data, a time interval identifier set, and a rendering parameter identifier set; where the data identifier set includes a plurality of data identifiers, the time interval identifier set includes a plurality of time interval identifiers, and the rendering parameter identifier set includes a plurality of rendering parameter identifiers; where the data identifiers are in one-to-one correspondence with the time interval identifiers, and the rendering parameter identifiers are in one-to-one correspondence with the time interval identifiers. The sending unit is configured to send the rendering instruction to a target rendering system. The determining unit is configured to determine a target time interval identifier corresponding to current time, and determine, according to the rendering instruction, a target data identifier and a target rendering parameter identifier which correspond to the target time interval identifier; and determine to-be-rendered data corresponding to the target data identifier and target rendering parameter corresponding to the target rendering parameter identifier. The rendering unit is configured to perform, through the target rendering system, a rendering operation on the to-be-rendered data according to the target rendering parameter.

According to an implementation of the present disclosure, a terminal is provided. The terminal includes at least one processor and a computer readable storage coupled to the at least one processor. The computer readable storage stores computer programs thereon, which when executed by the processor, cause the processor to: store a rendering instruction when a JS engine of the terminal receives the rendering instruction, where the rendering instruction carries a data identifier set of to-be-rendered data, a time interval identifier set, and a rendering parameter identifier set; where the data identifier set includes a plurality of data identifiers, the time interval identifier set includes a plurality of time interval identifiers, and the rendering parameter identifier set includes a plurality of rendering parameter identifiers; where the data identifiers are in one-to-one correspondence with the time interval identifiers, and the rendering parameter identifiers are in one-to-one correspondence with the time interval identifiers; send the rendering instruction to a target rendering system; determine a target time interval identifier corresponding to current time, and determine, according to the rendering instruction, a target data identifier and a target rendering parameter identifier which correspond to the target time interval identifier; determine to-be-rendered data corresponding to the target data identifier, and determine target rendering parameter corresponding to the target rendering parameter identifier; and perform, through the target rendering system, a rendering operation on the to-be-rendered data according to the target rendering parameter.

According to an implementation of the present disclosure, a non-transitory computer readable storage medium is provided. The non-transitory computer readable storage medium is configured to store computer programs which, when executed by a processor, cause the processor to: store a rendering instruction when a JS engine of a terminal receives the rendering instruction, where the rendering instruction carries a data identifier set of to-be-rendered data, a time interval identifier set, and a rendering parameter identifier set; where the data identifier set includes a plurality of data identifiers, the time interval identifier set includes a plurality of time interval identifiers, and the rendering parameter identifier set includes a plurality of rendering parameter identifiers; where the data identifiers are in one-to-one correspondence with the time interval identifiers, and the rendering parameter identifiers are in one-to-one correspondence with the time interval identifiers; send the rendering instruction to a target rendering system; determine a target time interval identifier corresponding to current time, and determine, according to the rendering instruction, a target data identifier and a target rendering parameter identifier which correspond to the target time interval identifier; determine to-be-rendered data corresponding to the target data identifier, and determine target rendering parameter corresponding to the target rendering parameter identifier; and perform, through the target rendering system, a rendering operation on the to-be-rendered data according to the target rendering parameter.

According to an implementation of the present disclosure, a computer program product is provided. The computer program product includes a non-transitory computer-readable storage medium that stores computer programs which, when executed by a processor, cause the processor to: store a rendering instruction when a JS engine of a terminal receives the rendering instruction, where the rendering instruction carries a data identifier set of to-be-rendered data, a time interval identifier set, and a rendering parameter identifier set; where the data identifier set includes a plurality of data identifiers, the time interval identifier set includes a plurality of time interval identifiers, and the rendering parameter identifier set includes a plurality of rendering parameter identifiers; where the data identifiers are in one-to-one correspondence with the time interval identifiers, and the rendering parameter identifiers are in one-to-one correspondence with the time interval identifiers; send the rendering instruction to a target rendering system; determine a target time interval identifier corresponding to current time, and determine, according to the rendering instruction, a target data identifier and a target rendering parameter identifier which correspond to the target time interval identifier; determine to-be-rendered data corresponding to the target data identifier, and determine target rendering parameter corresponding to the target rendering parameter identifier; and perform, through the target rendering system, a rendering operation on the to-be-rendered data according to the target rendering parameter.

The electronic device referred to in the implementations of the present disclosure may include various devices having wireless communication functions, such as handheld devices (e.g., smart phones), in-vehicle devices, wearable devices, computing devices, or other processing devices connected to wireless modems, and various other devices, such as user equipments (UE), mobile stations (MS), terminal devices, R&D/test platforms, servers, etc. For convenience of description, the devices mentioned above are collectively referred to as terminals.

The implementations of the present disclosure are described in detail below.

FIG. 1 is a schematic flowchart of a game rendering method according to an implementation of the present disclosure. The game rendering method is applied to a terminal and includes the following actions at blocks illustrated in FIG. 1.

At block 101, a rendering instruction is stored when a JavaScript (JS) engine of the terminal receives the rendering instruction.

In the implementation of the present disclosure, the JS engine can store the rendering instruction in a specified area when it receives the rendering instruction. The specified area may be set by a user or default for system. The rendering instruction may carry a data identifier set of to-be-rendered data, a time interval identifier set, and a rendering parameter identifier set. The data identifier set includes a plurality of data identifiers. The time interval identifier set includes a plurality of time interval identifiers. The rendering parameter identifier set includes a plurality of rendering parameter identifiers. The data identifiers are in one-to-one correspondence with the time interval identifiers, and the rendering parameter identifiers are in one-to-one correspondence with the time interval identifiers. The identifier is configured to acquire corresponding to-be-rendered data. The rendering parameter identifier is configured to acquire corresponding rendering parameter.

In this implementation of the present disclosure, the rendering parameter may include at least one of the following: rendering modes, rendering colors, rendering brightness, which are not limited herein. The following table provides a one-to-one correspondence between the time interval identifiers and the data identifiers.

| Data identifiers | Time interval identifiers |
|---|---|
| S1 | T1 |
| S2 | T2 |
| S3 | T3 |
| ... | ... |
| Sn | Tn |

In the implementation, one time interval identifier corresponds to one data identifier, for example, a time interval identifier T1 corresponds to a data identifier S1.

System of the terminal can be Android system, IOS system, or other system. Taking Android system as an example, using V8 in Android system can make full use of built-in engine capabilities of Android system and improve performance of JS codes running on V8. When the system type of the terminal is IOS system, using JavaScript Core in IOS system can make full use of built-in engine capabilities of IOS system and improve performance of JS codes running on JavaScript Core. It should be noted that, the JS engine in the implementation of the present disclosure is different from the JS engine developed by general browser developers. Since browsers need to do a lot of other things besides parsing game codes, such as parsing pages, rendering pages, cookie management, historical records, etc., the JS engine developed by the browser developers is more complex and needs to implement more functions. The JS engine in the implementation of the present disclosure is a JS engine specifically developed for parsing game codes, which may also be called a JS game-specific engine. The JS game-specific engine is a specially designed engine for game codes parsing. Compared with the JS engine developed by the browser developers, the JS game-specific engine strips away some of the functions of the browser that are not relevant to games (e.g., cookie management function).

At block 102, the rendering instruction is sent to a target rendering system.

In a specific implementation, the terminal may send the rendering instruction to the target rendering system. The target rendering system may be a system of the terminal itself, such as Androi OpenGL ES, IOS openGL ES, etc., which are not limited herein.

At block 103, a target time interval identifier corresponding to current time is determined, and a target data identifier and a target rendering parameter identifier which correspond to the target time interval identifier are determined according to the rendering instruction.

In the implementation, the terminal may determine the target time interval identifier corresponding to the current time. Since the data identifiers have a one-to-one correspondence with the time interval identifiers, therefore, the target data identifier and the target rendering parameter identifier which correspond to the target time interval identifier can be determined.

At block 104, to-be-rendered data corresponding to the target data identifier, and target rendering parameter corresponding to the target rendering parameter identifier, are determined.

The terminal may pre-store a first mapping relationship between the data identifiers and the to-be-rendered data, and then determine the to-be-rendered data corresponding to the target data identifier according to the first mapping relationship. According to the above description, the terminal may also pre-store a second mapping relationship between the rendering parameter identifiers and the rendering parameters, and then determine the target rendering parameter corresponding to the target rendering parameter identifier according to the second mapping relationship.

At block 105, a rendering operation is performed on the to-be-rendered data according to the target rendering parameter by the target rendering system.

In an implementation, the terminal performs, through the target rendering system, a rendering operation on the to-be-rendered data according to the target rendering parameter, and may further displays images after the rendering operation.

In an optional implementation, the following actions may be further included prior to the action at block 102.

Action A1, target identification information of the terminal is acquired.

Action A2, the target rendering system corresponding to the target identification information is determined according to a third mapping relationship between preset identification information and preset rendering systems.

In the implementation of the present disclosure, the identification information may be at least one of the following: a model, an equipment manufacturer, an electronic number, a MAC address, and the like, which are not limited herein. Specifically, the third mapping relationship between the preset identification information and the preset rendering systems may be pre-stored in the terminal. Such that, when the terminal acquires the target identification information of the terminal, the target rendering system corresponding to the target identification information may be determined according to the third mapping relationship.

In an optional implementation, the target rendering system may be a multi-core system, for example, a dual-core system. The target rendering system includes a first rendering system and a second rendering system.

The action that the rendering operation is performed on the to-be-rendered data according to the target rendering parameter by the target rendering system, as illustrated at block 105, may include the following actions.

Action 51, first to-be-rendered sub-data and second to-be-rendered sub-data are acquired by dividing the to-be-rendered data.

Action 52, a first target rendering parameter corresponding to the first to-be-rendered sub-data and a second target rendering parameter corresponding to the second to-be-rendered sub-data are determined according to the target rendering parameter.

Action 53, first rendered data is acquired by the first rendering system performing, according to the first target rendering parameter, a rendering operation on the first to-be-rendered sub-data.

Action 54, second rendered data is acquired by the second rendering system performing, according to the second target rendering parameter, a rendering operation on the second to-be-rendered sub-data.

Action 55, target rendered data is acquired by synthesizing the first rendered data and the second rendered data.

In a specific implementation, the terminal may divide the to-be-rendered data to acquire the first to-be-rendered sub-data and the second to-be-rendered sub-data. Of course, the terminal may also divide the target rendering parameter, that is, the first target rendering parameter corresponding to the first to-be-rendered sub-data, and the second target rendering parameter corresponding to the second to-be-rendered sub-data are determined. The first rendering data is acquired by the first rendering system performing, according to the first target rendering parameter, a rendering operation on the first to-be-rendered sub-data. The second rendering data is acquired by the second rendering system performing, according to the second target rendering parameter, a rendering operation on the second to-be-rendered sub-data. Finally, the target rendered data is acquired by synthesizing the first rendered data and the second rendered data. In this way, the rendering operation can be accomplished through dual-core cooperation. In addition, the rendering parameters may also be a set. For example, different regions in a graph have different rendering parameters. In a specific implementation, the terminal may determine regions respectively corresponding to the first to-be-rendered sub-data and the second to-be-rendered sub-data, and then determining, according to different regions, the first target rendering parameter corresponding to the first to-be-rendered sub-data and the second target rendering parameter corresponding to the second to-be-rendered sub-data. Both of the first target rendering parameter and the second target rendering parameter are partial parameters of the target rendering parameter, or are acquired based on the target rendering parameter.

In an optional implementation, the action that the first to-be-rendered sub-data and the second to-be-rendered sub-data are acquired by dividing the to-be-rendered data, may include the following actions.

Action 511, target region data and non-target region data are acquired by performing image segmentation on the to-be-rendered data.

Action 512, the target region data is taken as the first to-be-rendered sub-data, and the non-target region data is taken as the second to-be-rendered sub-data.

In the implementation, the terminal may perform image segmentation on the to-be-rendered data. Algorithm of the image segmentation may be region-based image segmentation or edge-based image segmentation, which is not limited herein. Specifically, the terminal may perform image segmentation on the to-be-rendered data to acquire the target region data and the non-target region data, and further take the target region data as the first to-be-rendered sub-data, and take the non-target region data as the second to-be-rendered data.

In an optional implementation, the action that the first to-be-rendered sub-data and the second to-be-rendered sub-data are acquired by dividing the to-be-rendered data, may include the following actions.

Action 513, brightness data and color data are acquired by extracting data from the to-be-rendered data.

Action 514, the brightness data is taken as the first to-be-rendered sub-data, and the color data is taken as the second to-be-rendered sub-data.

The terminal can perform color space conversion, such as a YUV space, on the to-be-rendered data, then extract the brightness data and the color data, and take the brightness data as the first to-be-rendered sub-data, and take the color data as the second to-be-rendered sub-data.

In an optional implementation, the action that a first target rendering parameter corresponding to the first to-be-rendered sub-data and a second target rendering parameter corresponding to the second to-be-rendered sub-data are determined according to the target rendering parameter, may include the following actions.

Action 521, a first color parameter of the first to-be-rendered sub-data and a second color parameter of the second to-be-rendered sub-data are determined.

Action 522, a first adjustment coefficient corresponding to the first color parameter and a second adjustment coefficient corresponding to the second color parameter, are determined according to a fourth mapping relationship between preset color parameters and preset adjustment coefficients.

Action 523, the first target rendering parameter and the second target rendering parameter are acquired according to the first adjustment coefficient, the second adjustment coefficient, and the target rendering parameter.

In the implementation, the color parameter may be color saturation, which is configured to indicate a uniformity degree of color, and may be expressed as a percentage or a color cast value. The terminal may determine the first color parameter of the first to-be-rendered sub-data, and the second color parameter of the second to-be-rendered sub-data. The value of the adjustment coefficient may be between 0 and 1. The terminal may pre-store the fourth mapping relationship between the preset color parameters and the preset adjustment coefficients, and then determine, according to the fourth mapping relationship, the first adjustment coefficient corresponding to the first color parameter and the second adjustment coefficient corresponding to the second color parameter. In the implementation, the first target rendering parameter=the first adjustment coefficient*the target rendering parameter, and the second target rendering parameter=the second adjustment coefficient*target rendering parameter.

In an optional implementation, the following actions may be further included prior to the action at block 101.

Action B1, an initialization operation of a game platform is performed, where the initialization operation includes loading a rendering capability into the JS engine. The JS engine includes an application programming interface (API) which is configured to invoke capabilities.

Action B2, a capability invocation instruction is received, and a capability invocation of the JS engine is realized by converting the capability invocation instruction into a corresponding API command, and then the action that the rendering instruction is stored when the JS engine receives the rendering instruction is performed.

In the implementation, the initialization operation may specifically include loading underlying capabilities into the JS engine. The JS engine includes an application programming interface (API) which is configured to invoke the underlying capabilities. The capabilities may include but are not limited to rendering capabilities, network operations, file operations, local storage, audio, web socket. The underlying capabilities are realized by C++. The present disclosure does not limit the specific implementation of the C++. Of course, multiple rendering capabilities can also be stored in the terminal, and different rendering effects and rendering efficiency can be achieved by different rendering capabilities.

According to the technical solution provided in the present disclosure, when the game platform is initialized, the API is loaded into the JS engine to realize the invocation of the underlying capabilities, so that when the capability invocation instruction is received, the game platform can directly convert the capability invocation instruction into the corresponding API command, and transmit the API command to the JS engine to realize the invocation of the underlying capabilities, thereby facilitating the developer to invoke the underlying capabilities of the game platform and improving the speed of game development.

In an optional implementation, the action that the capability invocation of the JS engine is realized by converting the capability invocation instruction into the corresponding API command, is specifically implemented as follow.

A first API corresponding to a first capability of the capability invocation instruction is determined according to a fifth mapping relationship between preset instructions and preset APIs, and the JS engine sends a first API invocation instruction to the underlying layer (C++ layer) through the first API. The underlying layer acquires a first result by running the first capability corresponding to the first API, and returns the first result to the JS engine.

The fifth mapping relationship may be preset by a user or may be determined by an actual invocation relationship. Specifically, for example, the capability invocation instruction is an audio, and the API corresponding to the capability invocation instruction may be an API corresponding to the audio.

APIs are predefined functions that provide applications and developers with the abilities to access a set of routines based on a software or hardware, without having to access source codes or understand the details of internal working mechanisms.

In Linux, the API follows POSIX standard, the most popular application programming interface standard in UNIX. The POSIX standard is a standard system jointly developed by IEEE and ISO/IEC. Based on existing UNIX practices and experience at that time, the standard describes the system call programming interfaces API of the operating system, which is configured to ensure that applications can be transplanted and run on multiple operating systems at the source level. These system call programming interfaces are mainly implemented by library C (LIBC).

Internet-based applications are becoming more and more popular, and during the process, more sites open their own resources to developers to call. API calls provided externally make contents more relevant between sites, and these open platforms bring greater value to users, developers, and small and medium-sized websites.

Openness is the current development trend, more and more products are opening up. Current websites cannot retain users by restricting their departure. In contrast, the open architecture increases the stickiness of users. Before the advent of the wave of Web 2.0, open APIs and even source codes were mainly embodied in desktop applications, and now more and more Web applications open APIs for the developers.

Web 2.0 sites with sharing, standardization, decentralization, openness and modularization bring value to users, and it is also hoped that the services provided by the sites will have a larger number of users and service access through the open API.

After introducing products and services based on open API standards, the site does not need to spend much effort on market promotion. As long as the services or applications provided are excellent and easy to use, other sites will actively integrate the services provided by open API into their own applications. At the same time, the service application brought by this integrated API will also stimulate more creative applications.

In order to provide a unified API interface to the outside world, it is necessary to provide an open and unified API interface environment for sites that open resource calling APIs to developers, to help users access the functions and resources of the sites.

Of course, it's also meaningful for the sites that open API to provide good community support for third-party developers, which helps to attract more technicians to participate in the open development platform.

In an optional implementation, the capability invocation instruction includes an invocation of a plurality of capabilities. The action that the capability invocation of the JS engine is realized by converting the capability invocation instruction into the corresponding API command, is specifically implemented as follow.

A plurality of capabilities are determined according to the capability invocation instruction, an execution order of the plurality of capabilities and a plurality of APIs corresponding to the plurality of capabilities are determined according to types of the plurality of capabilities, and execution priorities of the plurality of APIs are determined according to the execution order.

For the invocation of the plurality of capabilities, since it involves the invocation of the plurality of capabilities, the plurality of capabilities may be executed in order. Then, after the order is determined according to the capability, each API is assigned an execution priority, in this way, the situation that the underlying layer cannot provide the corresponding capability of the API after the API is called due to different execution orders of the plurality of capabilities, won't occurs.

According to the technical solution provided in the present disclosure, after the game platform is initialized, the API is loaded into the JS engine to realize the invocation of the underlying capabilities, so that when the capability invocation instruction is received, the game platform can directly convert the capability invocation instruction into the corresponding API command, and transmit the API command to the JS engine to realize the invocation of the underlying capabilities, thereby facilitating the developer to invoke the underlying capabilities of the game platform and improving the speed of game development.

In an optional implementation, the following actions may be further included prior to the action at block 101.

Action C1, a target game is started.

Action C2, a target rendering period corresponding to the target game is determined according to a sixth mapping relationship between preset rendering periods and preset games.

Action C3, the time interval identifier set is determined according to the target rendering period.

In the implementation, the sixth mapping relationship between the preset rendering periods and the preset games may be pre-stored in the terminal. Specifically, after the target game is started, the terminal determines the target rendering period corresponding to the target game according to the sixth mapping relationship, and then determines the time interval identifier set according to the target rendering period. The rendering period may be understood as how often the rendering is performed. The time interval identifier set includes a plurality of time interval identifiers, and the time interval identifier can be understood as a specific time point.

Figure 2:
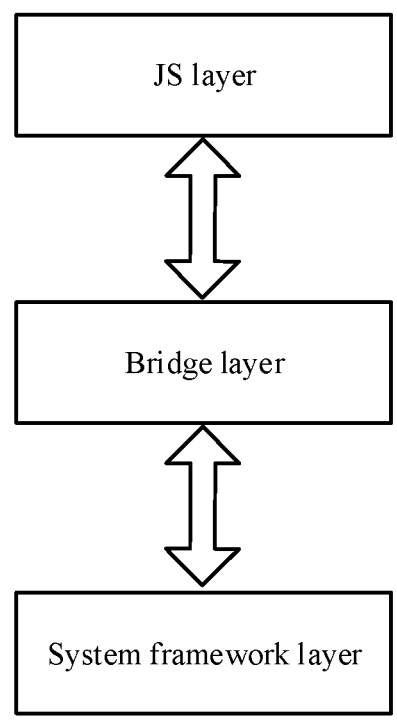
FIG. 2 is a schematic diagram showing a distribution of a system layer, a bridge layer, and a JS layer according to an implementation of the present disclosure.

In a specific implementation, the terminal 200 includes a system layer, a bridge layer, and a JS layer. As illustrated in FIG. 2, the system layer can be understood as an underlying layer, which is responsible for providing system capabilities related to the underlying layer of the terminal, such as a capability to access a memory, a capability to make phone calls, and the like. Taking a small game for an example, the small game can be a small game developed based on a browser environment, such as an HTML 5 (H5) game. The JS layer can be understood as an upper layer, which is responsible for running small games. Game codes of the small games can be run in the JS layer, and the JS layer can also be called JavaScript layer. The bridge layer can be understood as a middle layer, which is configured to connect the system layer and the JS layer. The bridge layer can encapsulate the capabilities of the system layer into a unified application programming interface (API) that can be directly invoked by the JS layer. Each of the system layer, the bridge layer and the JS layer in the implementations of the present disclosure can be understood as a piece of codes. For example, the system layer can be a piece of program codes written in assembly language. The bridge layer can be a piece of program codes written in C++ language. The bridge layer can also be called a C++ layer. The JS layer can be a piece of program codes written in Java language. In addition, the JS layer can be configured to select a two-dimensional (2D) rendering mode (for example, canvas context for 2D) or a three-dimensional (3D) rendering mode (for example, WebGL context for 3D). The bridge layer mainly implements web view function, week and reactnative. The system layer can be an Android system or an IOS system. The corresponding OpenGL ES2 can be invoked by the system layer to implement the rendering function.

It can be seen that, according to the game rendering method described in the implementations of the present disclosure, the rendering instruction is stored when the JS engine receives the rendering instruction, where the rendering instruction carries a data identifier set of to-be-rendered data, a time interval identifier set, and a rendering parameter identifier set; where the data identifier set includes a plurality of data identifiers, the time interval identifier set includes a plurality of time interval identifiers, and the rendering parameter identifier set includes a plurality of rendering parameter identifiers; where the data identifiers are in one-to-one correspondence with the time interval identifiers, and the rendering parameter identifiers are in one-to-one correspondence with the time interval identifiers. The rendering instruction is sent to a target rendering system. The target time interval identifier corresponding to current time is determined, and then the target data identifier and a target rendering parameter identifier which correspond to the target time interval identifier are determined according to the rendering instruction. The to-be-rendered data corresponding to the target data identifier, and the target rendering parameter corresponding to the target rendering parameter identifier, are determined. Then the rendering operation is performed on the to-be-rendered data according to the target rendering parameter by the target rendering system. Therefore, continuous rendering can be achieved with a single rendering instruction, thereby reducing device power consumption.

Figure 3:
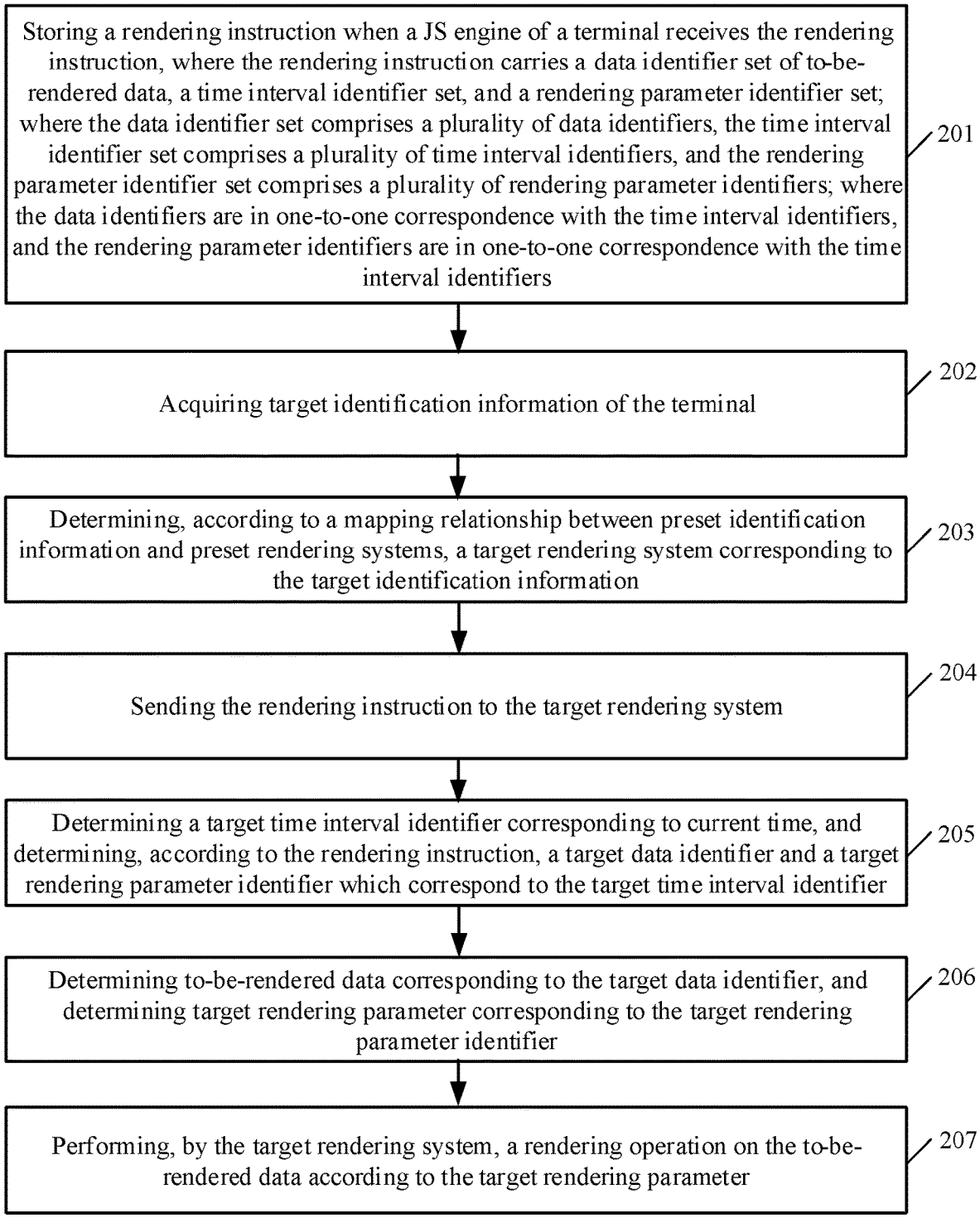
FIG. 3 is a schematic flowchart of another game rendering method according to an implementation of the present disclosure.

Consistent with the foregoing implementations, FIG. 3 is a schematic flowchart of another game rendering method according to an implementation of the present disclosure. The method is applied to the terminal mentioned above. The game rendering method includes the following actions at blocks illustrated in FIG. 3.

At block 201, a rendering instruction is stored when a JS engine of the terminal receives the rendering instruction. The rendering instruction may carry a data identifier set of to-be-rendered data, a time interval identifier set, and a rendering parameter identifier set. The data identifier set includes a plurality of data identifiers. The time interval identifier set includes a plurality of time interval identifiers. The rendering parameter identifier set includes a plurality of rendering parameter identifiers. The data identifiers are in one-to-one correspondence with the time interval identifiers, and the rendering parameter identifiers are in one-to-one correspondence with the time interval identifiers.

At block 202, target identification information of the terminal is acquired.

At block 203, a target rendering system corresponding to the target identification information is determined according to a mapping relationship between preset identification information and preset rendering systems.

At block 204, the rendering instruction is sent to the target rendering system.

At block 205, a target time interval identifier corresponding to current time is determined, and a target data identifier and a target rendering parameter identifier which correspond to the target time interval identifier are determined according to the rendering instruction.

At block 206, to-be-rendered data corresponding to the target data identifier, and target rendering parameter corresponding to the target rendering parameter identifier, are determined.

At block 207, a rendering operation is performed on the to-be-rendered data according to the target rendering parameter by the target rendering system.

For detailed description of the foregoing actions at the blocks 201-207, reference may be made to the corresponding description of the game rendering method described in FIG. 1, which are not described herein again.

It can be seen that, according to the game rendering method described in the implementations of the present disclosure, the rendering instruction is stored when the JS engine receives the rendering instruction, where the rendering instruction carries a data identifier set of to-be-rendered data, a time interval identifier set, and a rendering parameter identifier set; where the data identifier set includes a plurality of data identifiers, the time interval identifier set includes a plurality of time interval identifiers, and the rendering parameter identifier set includes a plurality of rendering parameter identifiers; where the data identifiers are in one-to-one correspondence with the time interval identifiers, and the rendering parameter identifiers are in one-to-one correspondence with the time interval identifiers. Target identification information of the terminal is acquired. Target rendering system corresponding to the target identification information is determined according to a mapping relationship between preset identification information and preset rendering systems. The rendering instruction is sent to the target rendering system. The target time interval identifier corresponding to current time is determined, and then the target data identifier and a target rendering parameter identifier which correspond to the target time interval identifier are determined according to the rendering instruction. The to-be-rendered data corresponding to the target data identifier, and the target rendering parameter corresponding to the target rendering parameter identifier, are determined. Then the rendering operation is performed on the to-be-rendered data according to the target rendering parameter by the target rendering system. Therefore, for different terminals, continuous rendering can be achieved with a single rendering instruction, thereby reducing device power consumption.

Figure 4:
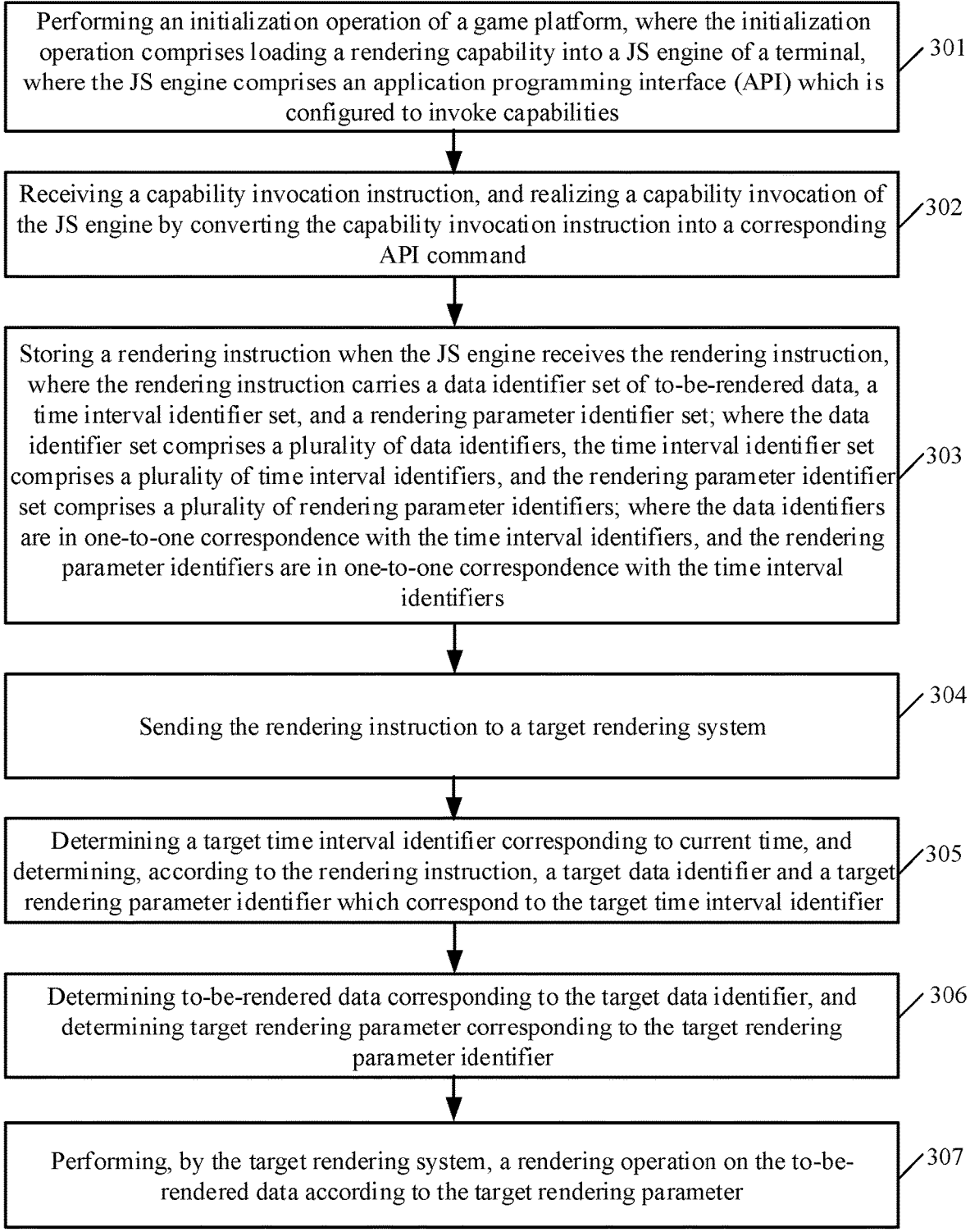
FIG. 4 is a schematic flowchart of yet another game rendering method according to an implementation of the present disclosure.

Consistent with the foregoing implementations, FIG. 4 is a schematic flowchart of yet another game rendering method according to an implementation of the present disclosure. The method is applied to the terminal mentioned above. The game rendering method includes the following actions at blocks illustrated in FIG. 4.

At block 301, an initialization operation of a game platform is performed, where the initialization operation includes loading a rendering capability into a JS engine of the terminal. The JS engine includes an application programming interface (API) which is configured to invoke capabilities.

At block 302, a capability invocation instruction is received, and a capability invocation of the JS engine is realized by converting the capability invocation instruction into a corresponding API command.

At block 303, a rendering instruction is stored when the JS engine receives the rendering instruction. The rendering instruction may carry a data identifier set of to-be-rendered data, a time interval identifier set, and a rendering parameter identifier set. The data identifier set includes a plurality of data identifiers. The time interval identifier set includes a plurality of time interval identifiers. The rendering parameter identifier set includes a plurality of rendering parameter identifiers. The data identifiers are in one-to-one correspondence with the time interval identifiers, and the rendering parameter identifiers are in one-to-one correspondence with the time interval identifiers.

At block 304, the rendering instruction is sent to a target rendering system.

At block 305, a target time interval identifier corresponding to current time is determined, and a target data identifier and a target rendering parameter identifier which correspond to the target time interval identifier are determined according to the rendering instruction.

At block 306, to-be-rendered data corresponding to the target data identifier, and target rendering parameter corresponding to the target rendering parameter identifier, are determined.

At block 307, a rendering operation is performed on the to-be-rendered data according to the target rendering parameter by the target rendering system.

For detailed description of the foregoing actions at the blocks 301-307, reference may be made to the corresponding description of the game rendering method described in FIG. 1, which are not described herein again.

It can be seen that, according to the game rendering method described in the implementations of the present disclosure, the initialization operation of a game platform is performed, where the initialization operation includes loading a rendering capability into the JS engine. The JS engine includes an application programming interface (API) which is configured to invoke capabilities. A capability invocation instruction is received, and a capability invocation of the JS engine is realized by converting the capability invocation instruction into a corresponding API command. The rendering instruction is stored when the JS engine receives the rendering instruction, where the rendering instruction carries a data identifier set of to-be-rendered data, a time interval identifier set, and a rendering parameter identifier set; where the data identifier set includes a plurality of data identifiers, the time interval identifier set includes a plurality of time interval identifiers, and the rendering parameter identifier set includes a plurality of rendering parameter identifiers; where the data identifiers are in one-to-one correspondence with the time interval identifiers, and the rendering parameter identifiers are in one-to-one correspondence with the time interval identifiers. Target identification information of the terminal is acquired. Target rendering system corresponding to the target identification information is determined according to a mapping relationship between preset identification information and preset rendering systems. The rendering instruction is sent to the target rendering system. The target time interval identifier corresponding to current time is determined, and then the target data identifier and a target rendering parameter identifier which correspond to the target time interval identifier are determined according to the rendering instruction. The to-be-rendered data corresponding to the target data identifier, and the target rendering parameter corresponding to the target rendering parameter identifier, are determined. Then the rendering operation is performed on the to-be-rendered data according to the target rendering parameter by the target rendering system. Therefore, device power consumption can be reduced.

Figure 5:
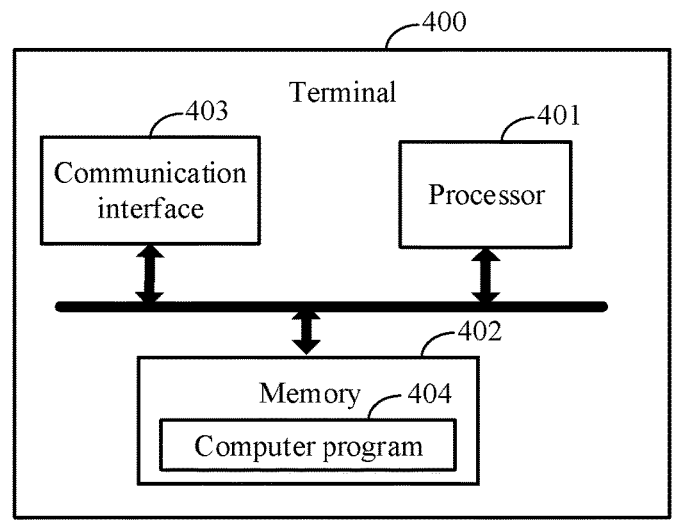
FIG. 5 is a schematic structural diagram of a terminal according to an implementation of the present disclosure.

FIG. 5 is a schematic structural diagram of a terminal 400 according to an implementation of the present disclosure. As illustrated in FIG. 5, the terminal 400 includes at least one processor 401, a memory 402, a communication interface 403, and one or more computer programs 404.

The processor 401 is a control center of the terminal 400, and is coupled to various parts (such as the memory 402 and the communication interface 403) of the whole terminal through various interfaces and lines, runs or executes software programs (such as the computer programs 404) and/or modules stored in the memory, and invokes data stored in the memory to perform various functions of the terminal and processes data, thereby monitoring the terminal as a whole.

The memory 402 is configured to store software programs (such as the computer programs 404) and/or modules, and the processor 401 executes various functional applications and data processing of the terminal by running the software programs and/or modules stored in the memory 402. In addition, the memory 402 is a computer readable storage, and may include a high-speed RAM, and may further include a non-volatile memory such as at least one disk storage device, flash memory device, or other volatile solid state storage device.

The one or more computer programs 404 are stored in the memory 402 and configured to be executed by the processor 401. The processor 401 is configured to execute the computer programs 404 to implement the game rendering method described in the foregoing implementations of the present disclosure.

Specifically, the computer programs 404 include computer executable instructions which when executed by the processor 401, cause the processor 401 to carry out the following actions.

A rendering instruction is stored when a JS engine of the terminal receives the rendering instruction. The rendering instruction may carry a data identifier set of to-be-rendered data, a time interval identifier set, and a rendering parameter identifier set. The data identifier set includes a plurality of data identifiers. The time interval identifier set includes a plurality of time interval identifiers. The rendering parameter identifier set includes a plurality of rendering parameter identifiers. The data identifiers are in one-to-one correspondence with the time interval identifiers, and the rendering parameter identifiers are in one-to-one correspondence with the time interval identifiers.

The rendering instruction is sent to a target rendering system.

A target time interval identifier corresponding to current time is determined, and a target data identifier and a target rendering parameter identifier which correspond to the target time interval identifier are determined according to the rendering instruction.

To-be-rendered data corresponding to the target data identifier, and target rendering parameter corresponding to the target rendering parameter identifier, are determined.

A rendering operation is performed on the to-be-rendered data according to the target rendering parameter by the target rendering system.

It can be seen that, according to the terminal described in the implementations of the present disclosure, the rendering instruction is stored when the JS engine receives the rendering instruction, where the rendering instruction carries a data identifier set of to-be-rendered data, a time interval identifier set, and a rendering parameter identifier set; where the data identifier set includes a plurality of data identifiers, the time interval identifier set includes a plurality of time interval identifiers, and the rendering parameter identifier set includes a plurality of rendering parameter identifiers; where the data identifiers are in one-to-one correspondence with the time interval identifiers, and the rendering parameter identifiers are in one-to-one correspondence with the time interval identifiers. The rendering instruction is sent to a target rendering system. The target time interval identifier corresponding to current time is determined, and then the target data identifier and a target rendering parameter identifier which correspond to the target time interval identifier are determined according to the rendering instruction. The to-be-rendered data corresponding to the target data identifier, and the target rendering parameter corresponding to the target rendering parameter identifier, are determined. Then the rendering operation is performed on the to-be-rendered data according to the target rendering parameter by the target rendering system. Therefore, continuous rendering can be achieved with a single rendering instruction, thereby reducing device power consumption.

In an optional implementation, the computer executable instructions further cause the processor 401 to carry out the following actions.

Target identification information of the terminal is acquired.

The target rendering system corresponding to the target identification information is determined according to a mapping relationship between preset identification information and preset rendering systems.

In an optional implementation, the target rendering system includes a first rendering system and a second rendering system.

The computer executable instructions that cause the processor 401 to carry out the action that the rendering operation is performed on the to-be-rendered data according to the target rendering parameter by the target rendering system, cause the processor 401 to carry out the following actions.

First to-be-rendered sub-data and second to-be-rendered sub-data are acquired by dividing the to-be-rendered data.

A first target rendering parameter corresponding to the first to-be-rendered sub-data and a second target rendering parameter corresponding to the second to-be-rendered sub-data are determined according to the target rendering parameter.

First rendered data is acquired by the first rendering system performing, according to the first target rendering parameter, a rendering operation on the first to-be-rendered sub-data.

Second rendered data is acquired by the second rendering system performing, according to the second target rendering parameter, a rendering operation on the second to-be-rendered sub-data.

Target rendered data is acquired by synthesizing the first rendered data and the second rendered data.

In an optional implementation, the computer executable instructions that cause the processor 401 to carry out the action that the first to-be-rendered sub-data and the second to-be-rendered sub-data are acquired by dividing the to-be-rendered data, cause the processor 401 to carry out the following actions.

Target region data and non-target region data are acquired by performing image segmentation on the to-be-rendered data.

The target region data is taken as the first to-be-rendered sub-data, and the non-target region data is taken as the second to-be-rendered sub-data.

In an optional implementation, the computer executable instructions that cause the processor 401 to carry out the action that the first to-be-rendered sub-data and the second to-be-rendered sub-data are acquired by dividing the to-be-rendered data, cause the processor 401 to carry out the following actions.

Brightness data and color data are acquired by extracting data from the to-be-rendered data.

The brightness data is taken as the first to-be-rendered sub-data, and the color data is taken as the second to-be-rendered sub-data.

In an optional implementation, the computer executable instructions that cause the processor 401 to carry out the action that the first target rendering parameter corresponding to the first to-be-rendered sub-data and the second target rendering parameter corresponding to the second to-be-rendered sub-data are determined according to the target rendering parameter, cause the processor 401 to carry out the following actions.

A first color parameter of the first to-be-rendered sub-data and a second color parameter of the second to-be-rendered sub-data are determined.

A first adjustment coefficient corresponding to the first color parameter and a second adjustment coefficient corresponding to the second color parameter, are determined according to a mapping relationship between preset color parameters and preset adjustment coefficients.

The first target rendering parameter and the second target rendering parameter are acquired according to the first adjustment coefficient, the second adjustment coefficient, and the target rendering parameter.

In an optional implementation, the computer executable instructions further cause the processor 401 to carry out the following actions.

An initialization operation of a game platform is performed, where the initialization operation includes loading a rendering capability into the JS engine. The JS engine includes an application programming interface (API) which is configured to invoke capabilities.

A capability invocation instruction is received, and a capability invocation of the JS engine is realized by converting the capability invocation instruction into a corresponding API command, and then the action that the rendering instruction is stored when the JS engine receives the rendering instruction is performed.

In an optional implementation, the computer executable instructions that cause the processor 401 to carry out the action that a capability invocation of the JS engine is realized by converting the capability invocation instruction into a corresponding API command, cause the processor 401 to carry out the following actions.

A first API corresponding to a first capability of the capability invocation instruction is determined according to a mapping relationship between preset instructions and preset APIs, and the JS engine sends a first API invocation instruction to the underlying layer (C++ layer) through the first API. The underlying layer acquires a first result by running the first capability corresponding to the first API, and returns the first result to the JS engine.

In an optional implementation, the capability invocation instruction includes an invocation of a plurality of capabilities. The computer executable instructions that cause the processor 401 to carry out the action that a capability invocation of the JS engine is realized by converting the capability invocation instruction into a corresponding API command, cause the processor 401 to carry out the following actions.

A plurality of capabilities are determined according to the capability invocation instruction, an execution order of the plurality of capabilities and a plurality of APIs corresponding to the plurality of capabilities are determined according to types of the plurality of capabilities, and execution priorities of the plurality of APIs are determined according to the execution order.

In an optional implementation, the computer executable instructions further cause the processor 401 to carry out the following actions.

A target game is started.

A target rendering period corresponding to the target game is determined according to a mapping relationship between preset rendering periods and preset games.

The time interval identifier set is determined according to the target rendering period.

It should be noted that the specific implementation process of the present implementations may be referred to the specific implementation process described in the foregoing method implementations, and is not described herein.

The foregoing implementations mainly introduce the solution of the implementations of the present disclosure from the perspective of performing the process on the method side. It can be understood that in order to achieve the above functions, the terminal includes corresponding hardware structures and/or software modules to perform each function. Those skilled in the art will readily appreciate that the present disclosure can be implemented in a form of hardware or a combination of hardware and computer software in combination with the elements and algorithm steps of the various examples described in the implementations disclosed herein. Whether a function is implemented in hardware or computer software-driven hardware depends on the specific application and design constraints of the technical solution. Professional technicians may use different methods to implement the described functions for each particular application, but such implementation should not be considered to be beyond the scope of this disclosure.

The implementations of the present disclosure may perform functional units division on the terminal according to the method implementations. For example, each functional unit may be divided according to each function, or two or more functions may be integrated into one processing unit. The integrated unit can be implemented in the form of hardware or in the form of software functional units. It should be noted that the division of the units in the implementations of the present disclosure is schematic, and is only a logical functional division. In actual implementation, there may be another division manner.

Figure 6:
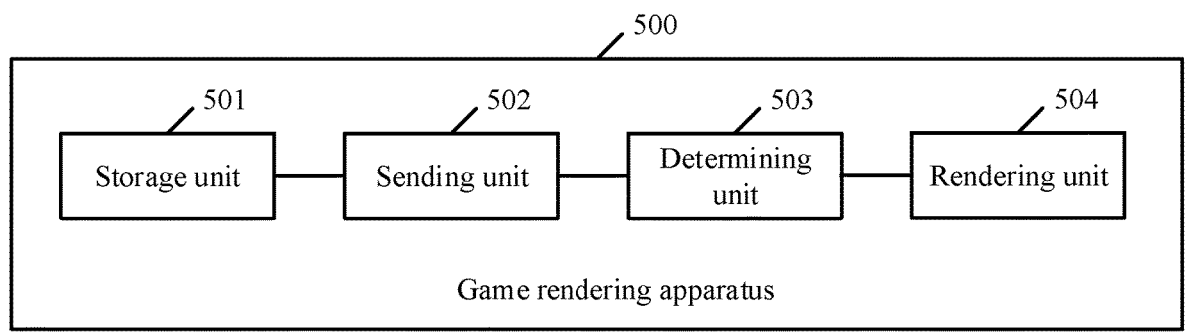
FIG. 6 is a schematic structural diagram of a game rendering apparatus according to an implementation of the present disclosure.

FIG. 6 is a schematic structural diagram of a game rendering apparatus according to an implementation of the present disclosure. The apparatus is applied to the terminal as illustrated in FIG. 5. The game rendering apparatus 500 includes a storage unit 501, a sending unit 502, a determining unit 503, and a rendering unit 504.

The storage unit 501 is configured to store a rendering instruction when a JS engine of the terminal receives the rendering instruction. The rendering instruction carries a data identifier set of to-be-rendered data, a time interval identifier set, and a rendering parameter identifier set. The data identifier set includes a plurality of data identifiers. The time interval identifier set includes a plurality of time interval identifiers. The rendering parameter identifier set includes a plurality of rendering parameter identifiers. The data identifiers are in one-to-one correspondence with the time interval identifiers, and the rendering parameter identifiers are in one-to-one correspondence with the time interval identifiers.

The sending unit 502 is configured to send the rendering instruction to a target rendering system.

The determining unit 503 is configured to determine a target time interval identifier corresponding to current time, and determine, according to the rendering instruction, a target data identifier and a target rendering parameter identifier which correspond to the target time interval identifier; and further configured to determine to-be-rendered data corresponding to the target data identifier and target rendering parameter corresponding to the target rendering parameter identifier.

The rendering unit 504 is configured to perform, through the target rendering system, a rendering operation on the to-be-rendered data according to the target rendering parameter.

It can be seen that, according to the game rendering apparatus described in the implementations of the present disclosure, the rendering instruction is stored when the JS engine receives the rendering instruction, where the rendering instruction carries a data identifier set of to-be-rendered data, a time interval identifier set, and a rendering parameter identifier set; where the data identifier set includes a plurality of data identifiers, the time interval identifier set includes a plurality of time interval identifiers, and the rendering parameter identifier set includes a plurality of rendering parameter identifiers; where the data identifiers are in one-to-one correspondence with the time interval identifiers, and the rendering parameter identifiers are in one-to-one correspondence with the time interval identifiers. The rendering instruction is sent to a target rendering system. The target time interval identifier corresponding to current time is determined, and then the target data identifier and a target rendering parameter identifier which correspond to the target time interval identifier are determined according to the rendering instruction. The to-be-rendered data corresponding to the target data identifier, and the target rendering parameter corresponding to the target rendering parameter identifier, are determined. Then the rendering operation is performed on the to-be-rendered data according to the target rendering parameter by the target rendering system. Therefore, continuous rendering can be achieved with a single rendering instruction, thereby reducing device power consumption.

Figure 7:
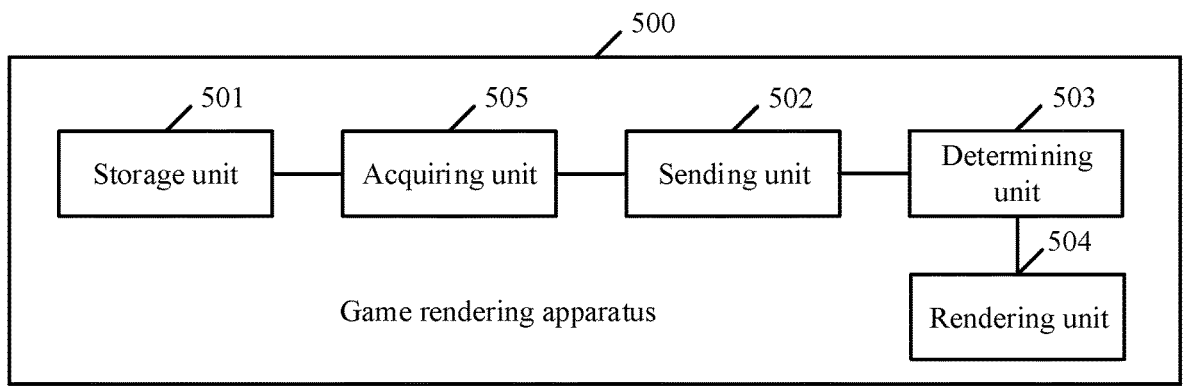
FIG. 7 is another schematic structural diagram of the game rendering apparatus according to an implementation of the present disclosure.

In an optional implementation, FIG. 7 is another modification of the game rendering apparatus illustrated in FIG. 6. Compared with FIG. 6, the apparatus as illustrated in FIG. 7 may also include an acquiring unit 505.

Specifically, the acquiring unit 505 is configured to acquire target identification information of the terminal.

The determining unit 503 is further configured to determine, according to a mapping relationship between preset identification information and preset rendering systems, the target rendering system corresponding to the target identification information.

In an optional implementation, the target rendering system includes a first rendering system and a second rendering system.

The rendering unit 504 configured to perform, through the target rendering system, a rendering operation on the to-be-rendered data according to the target rendering parameter, is specifically configured to acquire first to-be-rendered sub-data and second to-be-rendered sub-data by dividing the to-be-rendered data; determine, according to the target rendering parameter, a first target rendering parameter corresponding to the first to-be-rendered sub-data and a second target rendering parameter corresponding to the second to-be-rendered sub-data; acquire first rendering data by the first rendering system performing, according to the first target rendering parameter, a rendering operation on the first to-be-rendered sub-data; acquire second rendered data by the second rendering system performing, according to the second target rendering parameter, a rendering operation on the second to-be-rendered sub-data; and acquire target rendered data by synthesizing the first rendered data and the second rendered data.

In an optional implementation, the rendering unit 504 configured to acquire the first to-be-rendered sub-data and the second to-be-rendered sub-data by dividing the to-be-rendered data, is specifically configured to acquire target region data and non-target region data by performing image segmentation on the to-be-rendered data; and take the target region data as the first to-be-rendered sub-data, and take the non-target region data as the second to-be-rendered sub-data.

In an optional implementation, the rendering unit 504 is further specifically configured to acquire brightness data and color data by extracting data from the to-be-rendered data, and take the brightness data as the first to-be-rendered sub-data, and taking the color data as the second to-be-rendered sub-data.

In an optional implementation, the rendering unit 504 is further specifically configured to determine a first color parameter of the first to-be-rendered sub-data and a second color parameter of the second to-be-rendered sub-data, determine, according to a mapping relationship between preset color parameters and preset adjustment coefficients, a first adjustment coefficient corresponding to the first color parameter and a second adjustment coefficient corresponding to the second color parameter, and acquire the first target rendering parameter and the second target rendering parameter, according to the first adjustment coefficient, the second adjustment coefficient, and the target rendering parameter.

Figure 8:
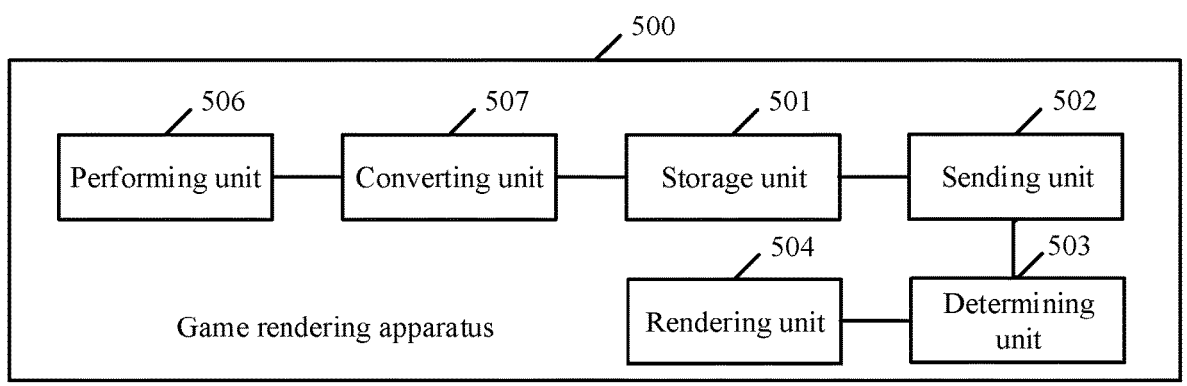
FIG. 8 is yet another schematic structural diagram of the game rendering apparatus according to an implementation of the present disclosure.

In an optional implementation, FIG. 8 is yet another modification of the game rendering apparatus illustrated in FIG. 6. Compared with FIG. 6, the apparatus as illustrated in FIG. 8 may also include a performing unit 506 and a converting unit 507.

Specifically, the performing unit 506 is configured to perform an initialization operation of a game platform, where the initialization operation includes loading a rendering capability into the JS engine, where the JS engine includes an application programming interface (API) which is configured to invoke capabilities.

The converting unit 507 is configured to receive a capability invocation instruction, and realize a capability invocation of the JS engine by converting the capability invocation instruction into a corresponding API command.

In an optional implementation, the converting unit 507 configured to realize the capability invocation of the JS engine by converting the capability invocation instruction into a corresponding API command, is specifically configured to determine, according to a mapping relationship between preset instructions and preset APIs, a first API corresponding to a first capability of the capability invocation instruction; send a first API invocation instruction to an underlying layer through the first API; and acquire a first result by the underlying layer running the first capability corresponding to the first API, and returning the first result to the JS engine.

In an optional implementation, the capability invocation instruction includes an invocation of a plurality of capabilities. The converting unit 507 configured to realize the capability invocation of the JS engine by converting the capability invocation instruction into a corresponding API command, is specifically configured to determine a plurality of capabilities according to the capability invocation instruction; determine, according to types of the plurality of capabilities, an execution order of the plurality of capabilities and a plurality of APIs corresponding to the plurality of capabilities; and determine execution priorities of the plurality of APIs according to the execution order.

Figure 9:
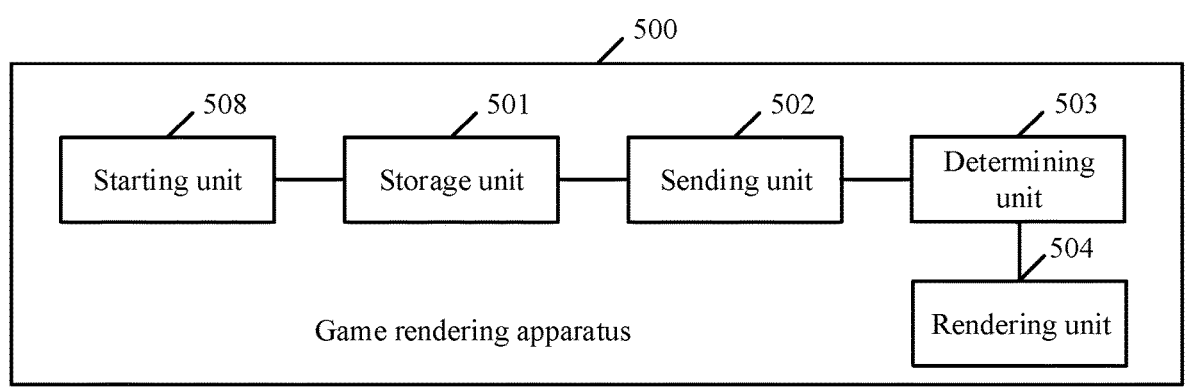
FIG. 9 is still another schematic structural diagram of the game rendering apparatus according to an implementation of the present disclosure.

In an optional implementation, FIG. 9 is still another modification of the game rendering apparatus illustrated in FIG. 6. Compared with FIG. 6, the apparatus as illustrated in FIG. 9 may also include a starting unit 508.

Specifically, the starting unit 508 is configured to start a target game.

The determining unit 503 is further configured to determine a target rendering period corresponding to the target game according to a mapping relationship between preset rendering periods and preset games, and determine the time interval identifier set according to the target rendering period.

It should be noted that the apparatus described in the implementations of the present disclosure is presented in the form of functional units. The term "unit" used herein should be understood as having the broadest possible meaning, and may include objects (such as an integrated circuit ASIC, a single circuit) for implementing the functions described by each "unit", a processor (shared or dedicated chipset) and a memory for executing one or more software or firmware programs, combined logic circuits, and/or other suitable components that can achieve the functions described above.

In the implementation, the functions of the storage unit 501, the sending unit 502, the determining unit 503, the rendering unit 504, the acquiring unit 505, the performing unit 506, the converting unit 507, and the starting unit 508 may be implemented by a processor.

Implementations of the present disclosure further provide a non-transitory computer readable storage medium, on which computer programs for electronic data interchange are stored. The computer programs are executed by a processor to implement the game rendering method described in the foregoing implementations of the present disclosure.

Specifically, the computer programs are executed by the processor to carry out the following actions. A rendering instruction is stored when a JS engine of the terminal receives the rendering instruction, where the rendering instruction carries a data identifier set of to-be-rendered data, a time interval identifier set, and a rendering parameter identifier set; where the data identifier set includes a plurality of data identifiers, the time interval identifier set includes a plurality of time interval identifiers, and the rendering parameter identifier set includes a plurality of rendering parameter identifiers; where the data identifiers are in one-to-one correspondence with the time interval identifiers, and the rendering parameter identifiers are in one-to-one correspondence with the time interval identifiers. The rendering instruction is sent to a target rendering system. A target time interval identifier corresponding to current time is determined, and then a target data identifier and a target rendering parameter identifier which correspond to the target time interval identifier are determined according to the rendering instruction. To-be-rendered data corresponding to the target data identifier, and target rendering parameter corresponding to the target rendering parameter identifier, are determined. Then a rendering operation is performed on the to-be-rendered data according to the target rendering parameter by the target rendering system.

It should be noted that the specific implementation process of the present implementations may be referred to the specific implementation process described in the foregoing method implementations, and is not described herein.

Implementations of the present disclosure also provide a computer program product. The computer program product includes a non-transitory computer-readable storage medium that stores computer programs. The computer programs are executed by a processor to implement the game rendering method described in the foregoing implementations of the present disclosure.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps may be performed in other order or simultaneously. Besides, it will be appreciated by those skilled in the art that the implementations described in the specification are example implementations and the actions and modules involved are not necessarily essential to the present disclosure.

In the foregoing implementations, the description of each implementation has its own emphasis. For the parts not described in detail in one implementation, reference may be made to related descriptions of other implementations.

In the implementations of the disclosure, the apparatus disclosed in implementations provided herein may be implemented in other manners. For example, the device/apparatus implementations described above are merely illustrative. For instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. Part or all of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit may be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or part of the operations of the various methods of the implementations described above may be accomplished by means of a program to instruct associated hardware, the program may be stored in a computer-readable memory, which may include a flash memory, a read-only memory (ROM), a random-access memory (RAM), Disk or compact disc (CD), and so on.

The implementations of the present disclosure are described in detail above, specific examples are used herein to describe the principle and implementation manners of the present disclosure. The description of the above implementations is merely used to help understand the method and the core idea of the present disclosure. Meanwhile, those skilled in the art may make modifications to the specific implementation manners and the application scope according to the idea of the present disclosure. In summary, the contents of the specification should not be construed as limiting the present disclosure.

What is claimed is:

1. A method for game rendering, being applied to a terminal, and the method comprising:
   performing an initialization operation of a game platform, wherein the initialization operation comprises loading a rendering capability into a JavaScript (JS) engine, wherein the JS engine comprises an application programming interface (API) that is configured to invoke capabilities;
   receiving a capability invocation instruction, and realizing a capability invocation of the JS engine by converting the capability invocation instruction into a corresponding API command;
   storing a rendering instruction when the JS engine of the terminal receives the rendering instruction, wherein the rendering instruction carries a data identifier set of to-be-rendered data, a time identifier set, and a rendering parameter identifier set; wherein the data identifier set comprises a plurality of data identifiers, the time identifier set comprises a plurality of time identifiers, and the rendering parameter identifier set comprises a plurality of rendering parameter identifiers; wherein the data identifiers are in one-to-one correspondence with the time identifiers, and the rendering parameter identifiers are in one-to-one correspondence with the time identifiers;
   sending the rendering instruction to a target rendering system;
   determining a target time identifier corresponding to current time, and determining, according to the rendering instruction, a target data identifier and a target rendering parameter identifier that correspond to the target time identifier;
   determining to-be-rendered data corresponding to the target data identifier, and determining target rendering parameter corresponding to the target rendering parameter identifier; and
   performing, by the target rendering system, a rendering operation on the to-be-rendered data according to the target rendering parameter.

2. The method of claim 1, further comprising:
   acquiring target identification information of the terminal; and
   determining, according to a mapping relationship between preset identification information and preset rendering systems, the target rendering system corresponding to the target identification information.

3. The method of claim 1, wherein the target rendering system comprises a first rendering system and a second rendering system; and
   wherein performing, by the target rendering system, the rendering operation on the to-be-rendered data according to the target rendering parameter comprises:
   acquiring first to-be-rendered sub-data and second to-be-rendered sub-data by dividing the to-be-rendered data;
   determining, according to the target rendering parameter, a first target rendering parameter corresponding to the first to-be-rendered sub-data and a second target rendering parameter corresponding to the second to-be-rendered sub-data;

acquiring first rendering data by the first rendering system performing, according to the first target rendering parameter, a rendering operation on the first to-be-rendered sub-data;

acquiring second rendered data by the second rendering system performing, according to the second target rendering parameter, a rendering operation on the second to-be-rendered sub-data; and acquiring target rendered data by synthesizing the first rendered data and the second rendered data.

4. The method of claim 3, wherein acquiring the first to-be-rendered sub-data and the second to-be-rendered sub-data by dividing the to-be-rendered data comprises:

acquiring target region data and non-target region data by performing image segmentation on the to-be-rendered data; and taking the target region data as the first to-be-rendered sub-data, and taking the non-target region data as the second to-be-rendered sub-data.

5. The method of claim 3, wherein acquiring the first to-be-rendered sub-data and the second to-be-rendered sub-data by dividing the to-be-rendered data comprises:

acquiring brightness data and color data by extracting data from the to-be-rendered data; and taking the brightness data as the first to-be-rendered sub-data, and taking the color data as the second to-be-rendered sub-data.

6. The method of claim 3, wherein determining, according to the target rendering parameter, the first target rendering parameter corresponding to the first to-be-rendered sub-data and the second target rendering parameter corresponding to the second to-be-rendered sub-data comprises:

determining a first color parameter of the first to-be-rendered sub-data and a second color parameter of the second to-be-rendered sub-data;

determining, according to a mapping relationship between preset color parameters and preset adjustment coefficients, a first adjustment coefficient corresponding to the first color parameter and a second adjustment coefficient corresponding to the second color parameter; and acquiring the first target rendering parameter and the second target rendering parameter, according to the first adjustment coefficient, the second adjustment coefficient, and the target rendering parameter.

7. The method of claim 1, wherein realizing the capability invocation of the JS engine by converting the capability invocation instruction into the corresponding API command comprises:

determining, according to a mapping relationship between preset instructions and preset APIs, a first API corresponding to a first capability of the capability invocation instruction;

sending, by the JS engine, a first API invocation instruction to an underlying layer through the first API; and acquiring a first result by the underlying layer running the first capability corresponding to the first API, and returning, by the underlying layer, the first result to the JS engine.

8. The method of claim 1, wherein the capability invocation instruction comprises an invocation of a plurality of capabilities; and wherein realizing the capability invocation of the JS engine by converting the capability invocation instruction into the corresponding API command comprises:

determining a plurality of capabilities according to the capability invocation instruction;

determining, according to types of the plurality of capabilities, an execution order of the plurality of capabilities and a plurality of APIs corresponding to the plurality of capabilities; and determining execution priorities of the plurality of APIs according to the execution order.

9. The method of claim 1, further comprising:

starting a target game;

determining a target rendering period corresponding to the target game according to a mapping relationship between preset rendering periods and preset games; and determining the time identifier set according to the target rendering period.

10. A terminal, comprising:

at least one processor; and a computer readable storage coupled to the at least one processor and storing computer programs thereon, which when executed by the processor, cause the processor to:

perform an initialization operation of a game platform, wherein the initialization operation comprises loading a rendering capability into a JavaScript (JS) engine, wherein the JS engine comprises an application programming interface (API) that is configured to invoke capabilities;

receive a capability invocation instruction, and realize a capability invocation of the JS engine by converting the capability invocation instruction into a corresponding API command;

store a rendering instruction when the JS engine of the terminal receives the rendering instruction, wherein the rendering instruction carries a data identifier set of to-be-rendered data, a time identifier set, and a rendering parameter identifier set;

wherein the data identifier set comprises a plurality of data identifiers, the time identifier set comprises a plurality of time identifiers, and the rendering parameter identifier set comprises a plurality of rendering parameter identifiers; wherein the data identifiers are in one-to-one correspondence with the time identifiers, and the rendering parameter identifiers are in one-to-one correspondence with the time identifiers;

send the rendering instruction to a target rendering system;

determine a target time interval identifier corresponding to current time, and determine, according to the rendering instruction, a target data identifier and a target rendering parameter identifier which that correspond to the target time interval identifier;

determine to-be-rendered data corresponding to the target data identifier, and determine target rendering parameter corresponding to the target rendering parameter identifier; and perform, through the target rendering system, a rendering operation on the to-be-rendered data according to the target rendering parameter.

11. The terminal of claim 10, wherein the computer programs further cause the processor to:

acquire target identification information of the terminal; and determine, according to a mapping relationship between preset identification information and preset rendering systems, the target rendering system corresponding to the target identification information.

12. The terminal of claim 10, wherein the target rendering system comprises a first rendering system and a second rendering system; and wherein the computer programs that cause the processor to perform, through the target rendering system, the rendering operation on the to-be-rendered data according to the target rendering parameter cause the processor to:
  acquire first to-be-rendered sub-data and second to-be-rendered sub-data by dividing the to-be-rendered data;
  determine, according to the target rendering parameter, a first target rendering parameter corresponding to the first to-be-rendered sub-data and a second target rendering parameter corresponding to the second to-be-rendered sub-data;
  acquire first rendering data by the first rendering system performing, according to the first target rendering parameter, a rendering operation on the first to-be-rendered sub-data;
  acquire second rendered data by the second rendering system performing, according to the second target rendering parameter, a rendering operation on the second to-be-rendered sub-data; and
  acquire target rendered data by synthesizing the first rendered data and the second rendered data.

13. The terminal of claim 12, wherein the computer programs that cause the processor to acquire the first to-be-rendered sub-data and the second to-be-rendered sub-data by dividing the to-be-rendered data cause the processor to:
  acquire target region data and non-target region data by performing image segmentation on the to-be-rendered data; and
  take the target region data as the first to-be-rendered sub-data, and take the non-target region data as the second to-be-rendered sub-data.

14. The terminal of claim 12, wherein the computer programs that cause the processor to acquire the first to-be-rendered sub-data and the second to-be-rendered sub-data by dividing the to-be-rendered data cause the processor to:
  acquire brightness data and color data by extracting data from the to-be-rendered data; and
  take the brightness data as the first to-be-rendered sub-data, and take the color data as the second to-be-rendered sub-data.

15. The terminal of claim 10, wherein the computer programs that cause the processor to realize the capability invocation of the JS engine by converting the capability invocation instruction into the corresponding API command cause the processor to:
  determine, according to a mapping relationship between preset instructions and preset APIs, a first API corresponding to a first capability of the capability invocation instruction;
  send, by the JS engine, a first API invocation instruction to an underlying layer through the first API; and
  acquire a first result by the underlying layer running the first capability corresponding to the first API, and returning, by the underlying layer, the first result to the JS engine.

16. The terminal of claim 10, wherein the capability invocation instruction comprises an invocation of a plurality of capabilities;
  wherein the computer programs that that cause the processor to realize the capability invocation of the JS engine by converting the capability invocation instruction into the corresponding API command cause the processor to:
    determine a plurality of capabilities according to the capability invocation instruction;
    determine, according to types of the plurality of capabilities, an execution order of the plurality of capabilities and a plurality of APIs corresponding to the plurality of capabilities; and
    determine execution priorities of the plurality of APIs according to the execution order.

17. The terminal of claim 10, wherein the computer programs further cause the processor to:
  start a target game;
  determine a target rendering period corresponding to the target game according to a mapping relationship between preset rendering periods and preset games; and
  determine the time identifier set according to the target rendering period.

18. A non-transitory computer-readable storage medium storing computer programs which, when executed by a processor, cause the processor to:
  perform an initialization operation of a game platform, wherein the initialization operation comprises loading a rendering capability into a JavaScript (JS) engine, wherein the JS engine comprises an application programming interface (API) that is configured to invoke capabilities;
  receive a capability invocation instruction, and realize a capability invocation of the JS engine by converting the capability invocation instruction into a corresponding API command;
  store a rendering instruction when the JS engine of a terminal receives the rendering instruction, wherein the rendering instruction carries a data identifier set of to-be-rendered data, a time identifier set, and a rendering parameter identifier set; wherein the data identifier set comprises a plurality of data identifiers, the time identifier set comprises a plurality of time identifiers, and the rendering parameter identifier set comprises a plurality of rendering parameter identifiers; wherein the data identifiers are in one-to-one correspondence with the time interval identifiers, and the rendering parameter identifiers are in one-to-one correspondence with the time identifiers;
  send the rendering instruction to a target rendering system;
  determine a target time identifier corresponding to current time, and determine, according to the rendering instruction, a target data identifier and a target rendering parameter identifier that correspond to the target time identifier;
  determine to-be-rendered data corresponding to the target data identifier, and determine target rendering parameter corresponding to the target rendering parameter identifier; and
  perform, through the target rendering system, a rendering operation on the to-be-rendered data according to the target rendering parameter.

* * * * *